United States Patent [19]
Hjorth

[11] Patent Number: 5,628,680
[45] Date of Patent: May 13, 1997

[54] WATER JET FISH CLEANING APPARATUS FOR KIRIMI PROCESSOR

[75] Inventor: Jens Hjorth, Seattle, Wash.

[73] Assignee: Royal Seafoods, Inc., Seattle, Wash.

[21] Appl. No.: 525,489

[22] Filed: Sep. 8, 1995

[51] Int. Cl.$^6$ .................................................... A22C 25/14
[52] U.S. Cl. ......................... 452/106; 452/116; 452/173; 452/170
[58] Field of Search .......................... 452/106, 173, 452/116, 119, 121, 123, 170

[56] References Cited

U.S. PATENT DOCUMENTS

| | | | |
|---|---|---|---|
| 1,975,018 | 9/1934 | Palmer . | |
| 2,502,175 | 3/1950 | Savrda . | |
| 2,835,918 | 5/1958 | Schlichting . | |
| 2,893,052 | 7/1959 | Schlichting . | |
| 2,920,343 | 1/1960 | Bartels et al. . | |
| 3,077,632 | 2/1963 | Brandes et al. . | |
| 3,187,375 | 6/1965 | Williamson et al. . | |
| 3,510,910 | 5/1970 | Erkins . | |
| 3,793,675 | 2/1974 | Hogan et al. . | |
| 3,816,876 | 6/1974 | Barrette, Jr. et al. . | |
| 4,084,293 | 4/1978 | Hogan et al. . | |
| 4,091,506 | 5/1978 | Soerensen et al. | 452/116 |
| 4,291,436 | 9/1981 | Wulff | 452/116 |
| 4,551,885 | 11/1985 | Molnar . | |
| 4,726,094 | 2/1988 | Braeger . | |
| 4,738,004 | 4/1988 | Lapeyre . | |
| 4,800,626 | 1/1989 | Wastell . | |
| 4,827,571 | 5/1989 | Ewing et al. | 452/170 |
| 4,882,811 | 11/1989 | Ewing . | |
| 4,956,894 | 9/1990 | Matsubayashi . | |
| 4,976,010 | 12/1990 | Lavelle, Jr. | 452/116 |
| 4,993,116 | 2/1991 | Urushibara et al. . | |
| 5,026,318 | 6/1991 | Jahnke | 452/116 |
| 5,106,335 | 4/1992 | Behnk et al. . | |
| 5,151,062 | 9/1992 | Pontow . | |
| 5,299,974 | 4/1994 | Jahnke . | |
| 5,458,535 | 10/1995 | Bullock et al. | 452/170 |

FOREIGN PATENT DOCUMENTS

454839  3/1949  Canada .

*Primary Examiner*—Willis Little
*Attorney, Agent, or Firm*—Christensen O'Connor Johnson & Kindness PLLC

[57] ABSTRACT

The present invention allows oval fish processing machinery designed to process pollock or salmon, such as the Baader 182, to be adapted to process flat fish such as sole to produce kirimi. One embodiment of the invention includes a generally rectangular fish holder that replaces the current fish holders on a fish processing machine. The fish holders include brackets having arms which extend over a portion of the fins and body of the flat fish to hold it in place on the fish holder. Two rotating blades cut through the flat fish held within the holder to remove the head and tail of the flat fish. Once the head and tail of the flat fish are removed, a water jet fish cleaning apparatus removes the blood spot and any internal organs remaining in the center portion of the flat fish to produce kirimi. The water jet fish cleaning apparatus includes a water jet nozzle that has one or more water passages. The passages direct a stream of water into the internal cavity in the center portion of fish. The stream of water from the water jet nozzle contacts and removes the blood spot of the fish. One of the passages directs a stream of water into the cavity approximately normal to the processing path. Another passage directs a stream of water partially forward along the processing path. In one embodiment, the water jet nozzle rotates to follow the center portion as it moves along the processing path.

12 Claims, 7 Drawing Sheets

WATER JET FISH CLEANING APPARATUS FOR KIRIMI PROCESSOR

FIELD OF THE INVENTION

The present invention relates to fish processing equipment, and more specifically to equipment designed to remove the heads, tails, and internal organs of flat fish, such as sole.

BACKGROUND OF THE INVENTION

Commercial fishermen catch and process tons of fish a day. Many fishermen have complex, highly-automated processing equipment which dress the fish and produce numerous different commercial products for commercial retailers, such as restaurant chains or grocery stores. Such equipment is highly specialized to perform a specific task, such as cutting the heads and tails off, filleting, deboning, and skiing, etc. One of the reasons such equipment must be tailored to specific tasks is the large variety of shapes and sizes of fish processed, including pollock, salmon, trout, sole, cod, etc.

To reduce overall processing costs and to improve quality, commercial fishing vessels include processing equipment and freezers located directly on the ships. As the fish are caught, they are immediately processed and frozen, substantially improving the quality of the final product. This processing equipment also allows the vessels to remain at sea for long periods of time without transporting the fish to a shore-based processing facility. Most of the processing equipment is large, complex, and expensive. It is difficult and expensive to remove the processing equipment from the vessel and replace it with new processing equipment.

Because of the expense associated with exchanging the processing equipment, including vessel downtime, most commercial processing ships are intended to catch and process specific types of fish. As an example, a vessel may be fitted with processing equipment designed to process generally oval fish having a relatively thick cross-section, such as pollock or salmon, or generally flat fish having a relatively thin cross-section, such as sole.

Due to the natural migration of fish, and various fishing laws, individual types of fish are caught and processed during limited parts of the year. Therefore, vessels having equipment capable of processing only one type of fish sit idle during part of the year. If the processing equipment could be readily exchanged or adapted to process both oval fish, such as pollock or salmon, and flat fish, such as sole, the vessels could be operated over a larger part of the year. This would in turn reduce the amount of downtime and associated expense for the vessels.

One manufacturer of fish processing equipment is Baader GmbH & Co. KG, Lubeck, Germany ("Baader"). One of the fish processing machines produced by Baader is the Baader 182. The Baader 182 is designed to process pollock and salmon shaped fish and includes a conveyor having a plurality of fish holders mounted along the length of the conveyor. Each fish holder includes a recess configured to receive a pollock. While operating, a worker removes fish from a fish hopper located next to the conveyor and places an individual pollock in the recess of each fish holder. The conveyor subsequently moves the fish holders and pollock along the length of the conveyor into contact with rotating blades that cut both the head and tail of the pollock off. The body of the pollock is then carried to additional equipment that cuts the pollock into fillets and removes the bones and skin.

The Baader 182 works well with fish having an oval cross-section, such as pollock, but does not allow other types of fish to be processed. The Baader 182 is particularly unsuitable for processing fish with a relative flat cross-section, such as sole. The fish holders used on the Baader 182 are not capable of holding such fish during processing.

In order to adapt the Baader 182 to process fish having a relatively thin cross-section, the inventor previously applied for and received a patent on a device for holding flat fish during processing. U.S. Pat. No. 5,358,441 entitled "Device for Holding Flat Fish During Processing" issued to the present inventor on Oct. 25, 1994. The device for holding flat fish during processing allows the Baader 182 to process flat fish in addition to pollock. One embodiment of the device included a generally rectangular fish holder that replaced the fish holders on the Baader 182. The fish holders include two arms which extend over a portion of the fins and body of a flat fish and hold it in place on the fish holder. The arms include two recesses that have slanted rear walls that center the flat fish as it is placed within the fish holder. Two slots extend across the width of the fish holder to allow rotating blades to extend beneath the upper surface of the fish holder to ensure that the blades cut cleanly through the thickness of the fish.

One of the products that the device for holding flat fish during processing allowed the Baader 182 to be used for is the processing of "kirimi." In order to make kirimi, the head and tail of a sole are removed, leaving the center portion of the sole. The center portion of the sole is then sold to consumers who fry, bake, or otherwise prepare the center portion for consumption. In the past, the center portion was sold complete with any internal organs remaining within the center portion. One of the internal organs remaining in the center portion after removing the head and tail is the kidney, commonly referred to as the "blood spot." The blood spot is located along the backbone of the sole in the internal organ cavity. In the past, the blood spot has been either removed by the individual consumer during preparation or removed by hand during processing after the head and tail are removed.

In today's highly competitive fishing industry, it is generally not economical to remove the blood spot by hand, thus the blood spot is generally left in the commercial kirimi product. If the blood spot could be removed during processing, a higher quality kirimi product would result.

As can be seen from the above discussion, there exists a need for a method to remove the blood spot and any other internal organs remaining in the kirimi after processing. The present invention is directed toward fulfilling this need.

SUMMARY OF THE INVENTION

The present invention is a water jet fish cleaning apparatus for removing the blood spot from kirimi after the head and tail have been removed. In one embodiment of the invention, a flat fish is held so that the head and tail of the fish may be cut off to form kirimi. The kirimi is then moved past a water jet nozzle that uses a stream of water to remove the blood spot and any remaining internal organs in the kirimi.

Some current processing machinery designed to process pollock may be retrofitted with the present invention. Alternatively, the present invention may be used on new equipment designed specifically to produce kirimi. The present invention may be retrofitted to existing processing equipment without substantial expenditures of time or money. Use of the present invention allows vessels designed for pollock processing to be easily converted to process flat fish, such as sole into kirimi. This allows the vessels to be used over a larger portion of the year, thus decreasing downtime and associated costs.

One embodiment of the present invention includes a tray for holding and locating the flat fish on a processing conveyor. At least one head and tail cutter are mounted along the processing path to remove the head and tail of the flat fish to form a center portion of kirimi as the flat fish is moved along the processing path. After the head and tail are removed, a water jet cleaning system is used to remove the blood spot and any remaining internal organs in the center portion. The water jet cleaning system includes a water jet nozzle located downstream from the head and tail cutters along the processing path. The water jet nozzle has one or more outlet passages that direct a stream of water into the cavity in the center portion of the flat fish. The water jet cleaning system produces a high pressure stream of water that flows through the outlet passages and into the cavity to remove the blood spot and any internal organs remaining in the center portion of the flat fish.

In accordance with other aspects of the invention, the water jet nozzle includes at least two outlet passages. One of the outlet passages directs a stream of water to flow approximately normal to the processing path and another outlet passage directs a stream of water to flow at an angle forward along the processing path.

In accordance with other features of the invention, the apparatus includes means to rotate the water jet nozzle as the flat fish is moved along the processing path. The nozzle is rotated so that the water jet passages rotate forward along the processing path to follow the cavity in the center portion of the flat fish. This allows the stream of water produced by the water jet cleaning system to remain directed into the internal cavity of the flat fish as the flat fish is moved along the processing path.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A preferred embodiment of the present invention will now be described by reference to FIGS. 1–7. The preferred embodiment shown is of a configuration designed to be used with processing equipment similar to the Baader 182 processor sold by Baader GmbH & Co. KG, Lubeck, Gemany. Although the present invention is described with respect to a preferred embodiment for use with the Baader 182, it may be used in other configurations designed for use with other processing equipment and is not limited to the embodiment shown.

Figure 1:
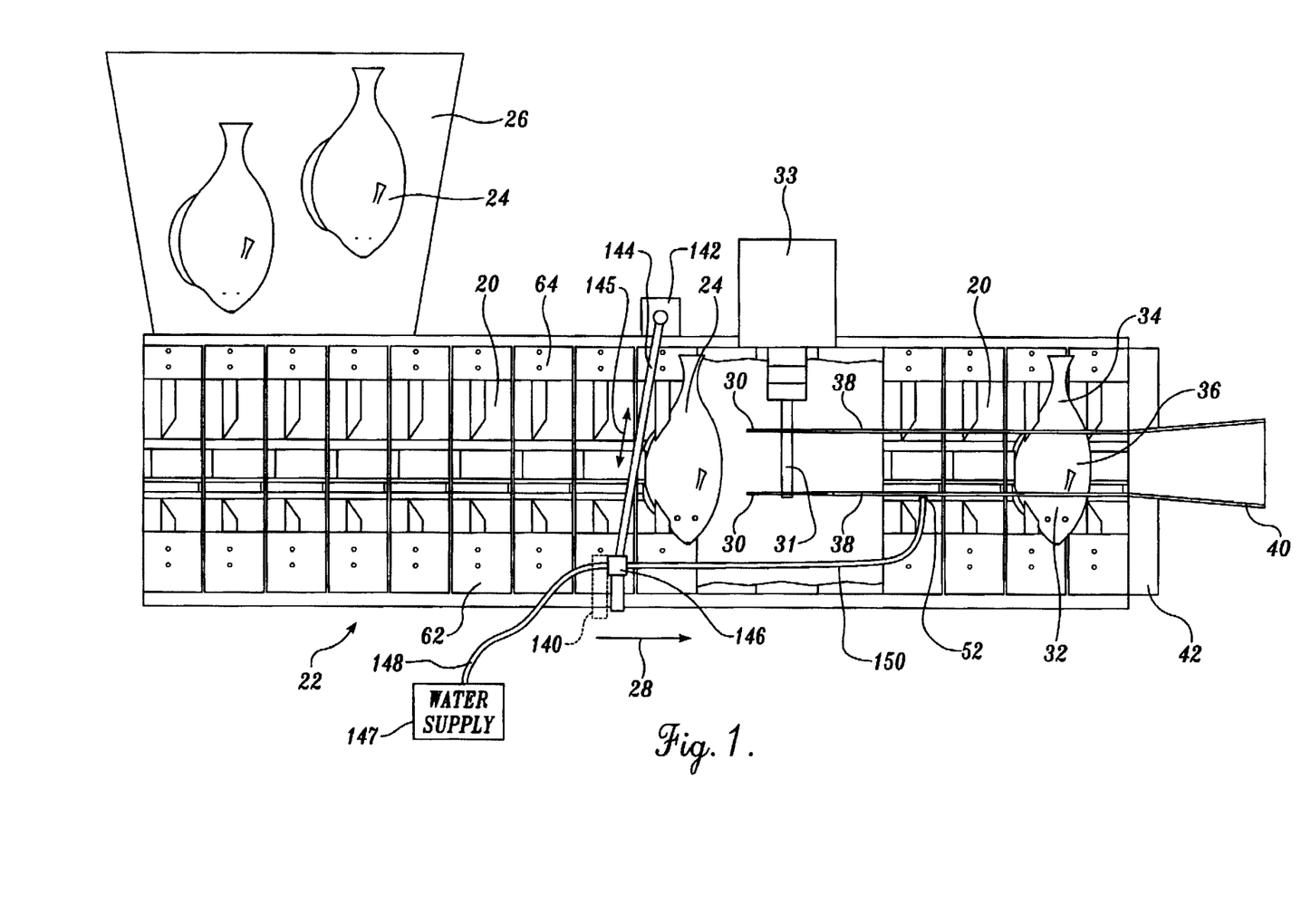
FIG. 1 is a top plan view of a fish processor that includes fish holders and a water jet cleaning system according to the present invention.
Figure 2:
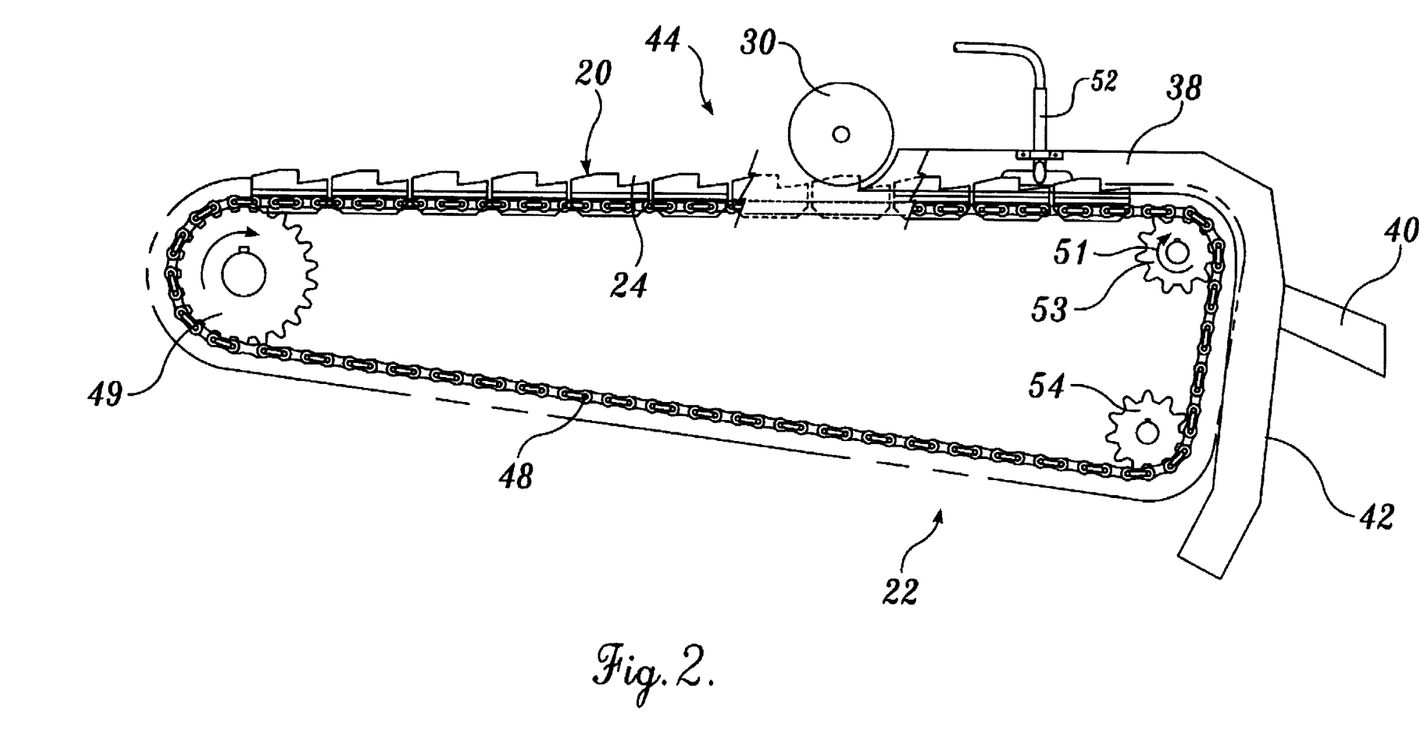
FIG. 2 is a side elevational view of the conveyor of the fish processor of FIG. 1.

As illustrated in FIGS. 1 and 2, the water jet fish cleaning apparatus for kirimi includes a fish hopper 26, a conveyor 22 having a series of fish holders 20, two cutting blades 30, a drive mechanism 33, and a water jet cleaning system 50 including a water supply 147, a water valve 146 and a water jet nozzle 52.

FIG. 1 illustrates a conveyor 22 of the type used in some processing equipment, as an example, the Baader 182. A plurality of fish trays or holders 20 are attached to the conveyor 22 so that they move from left to right along a processing path as the conveyor moves as illustrated by arrow 28. The conveyor 22 can be any continuous belt or similar conveyor driven in any manner well-known in the art. In the embodiment shown, the conveyor is driven through the use of a drive roller 53 (FIG. 2) including a series of teeth which engage a chain or drive belt 48. The drive roller 53 is in turn connected to a drive motor (not shown) which in turn is connected to a control device that controls the speed at which the conveyor 22 rotates. Although the conveyor 22 is shown as a continuous chain, any suitable type of conveyor can be used.

The drive belt 48 forms a continuous triangular loop, the corners of which are defined by the drive roller 53, a support roller 54 and a support roller 49 (FIG. 2). The support roller 54 is located underneath the drive roller 53 and the support roller 49 is located to the left of the drive roller 53 and support roller 54. The drive roller 53 rotates clockwise as shown by arrow 51, causing the upper portion of the conveyor to move to the right as shown by arrow 28 in FIG. 1.

A fish hopper 26 is located near the left end of the conveyor 22 and is supplied with a continuous supply of fish 24 from a supply chute (not shown). The fish hopper 26 can be any suitable shape capable of holding fish within reach of a worker. In operation, a worker removes an individual fish 24 from the fish hopper 26 and inserts it into an individual fish holder 20 as described in more detail below. The fish holder 20 helps to center the fish 24 and hold it during processing. After insertion into a fish holder, the conveyor 22 moves the fish to the right along the processing path as shown by arrow 28 (FIG. 1) such that the fish is brought into contact with two parallel rotating blades 30 as described below. As the fish is moved into contact with the blades 30, the head 32 and tail 34 (FIG. 1) of the fish are removed.

The two blades 30 are mounted on a rotatable shaft 31 (FIG. 4) that is in turn coupled to a drive mechanism 33 (FIG. 1). The drive mechanism 33 is any standard drive mechanism capable of driving the shaft and blades at a high RPM so that they may easily cut through the fish 24. In FIG. 1, the section of the conveyor underneath and adjacent the blades 30 and drive mechanism 33 is not shown in order to more clearly illustrate the location and details of the blades 30. Similarly, in FIG. 2, the portion of the conveyor 22 adjacent the blades 30 is shown in phantom in order to more clearly illustrate the blades and the divider sheets 38 as described in more detail below.

The rotatable shaft 31 extends partially across the width of the conveyor 22 parallel to the top of the conveyor and perpendicular to edge of the conveyor. The two blades 30 are circular cutting blades mounted on the shaft 31 at different positions so as to define the width of the center portion 36 of the fish remaining after removing the head and tail. The center portion 36 is referred to as kirimi.

In flat fish such as sole, the internal organs of the fish are located directly behind the head. Therefore, the blades 30 are generally spaced apart at a distance that removes both the head and the majority of the internal organs of the flat fish in a single cut. Similarly, the opposing circular blade 30 is spaced to remove the entire tail of the fish. Although the majority of the internal organs are moved along with the head, it is possible that a portion of the internal organs will remain in the portion of the organ cavity 59 (FIG. 6) remaining in the center portion 36. In addition, the kidney of the fish commonly referred to as the "blood spot" 58 also remains in the center portion of the fish.

Figure 5:
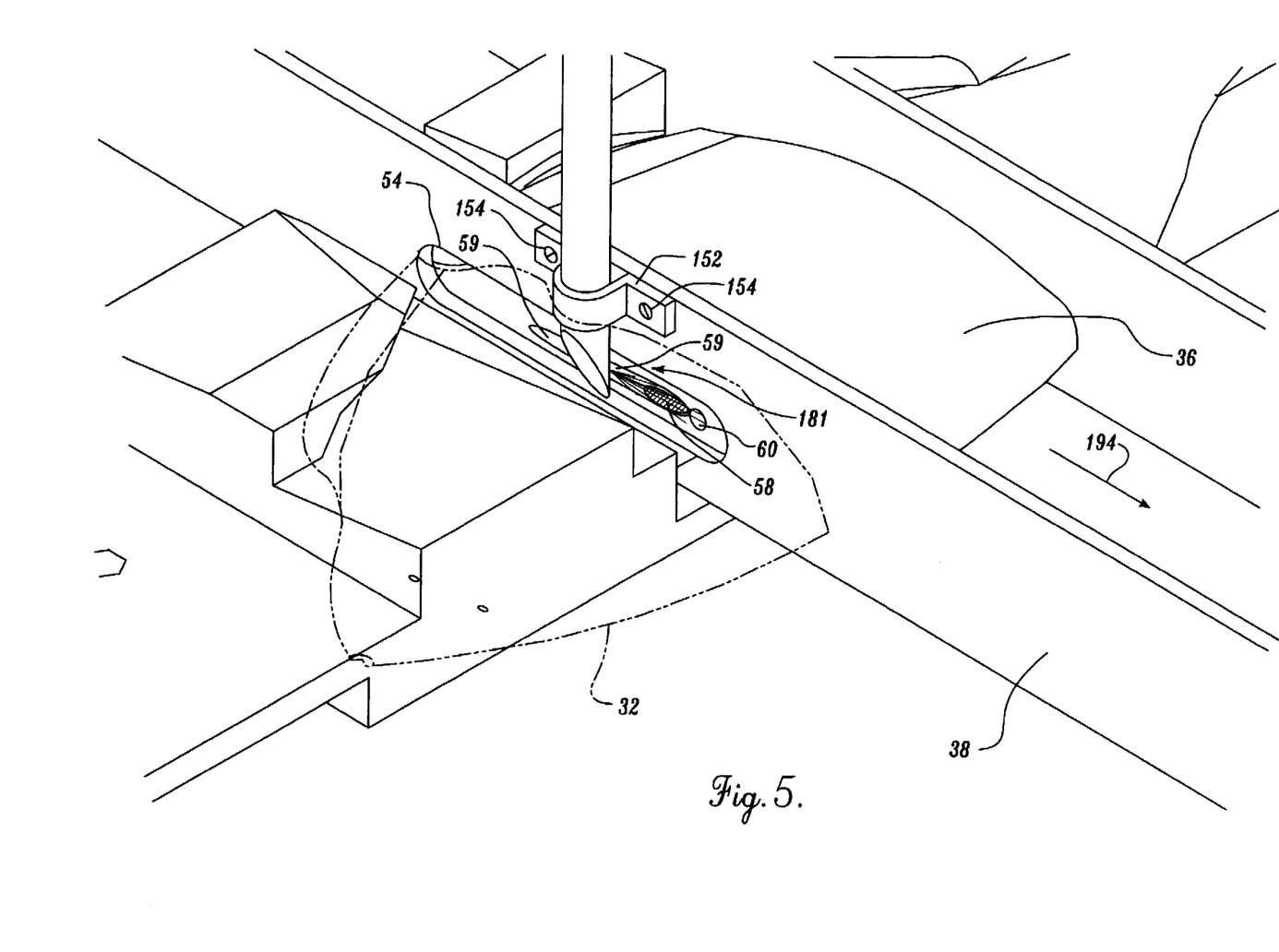
FIG. 5 is an enlarged perspective view of the water jet cleaner.
Figure 6:
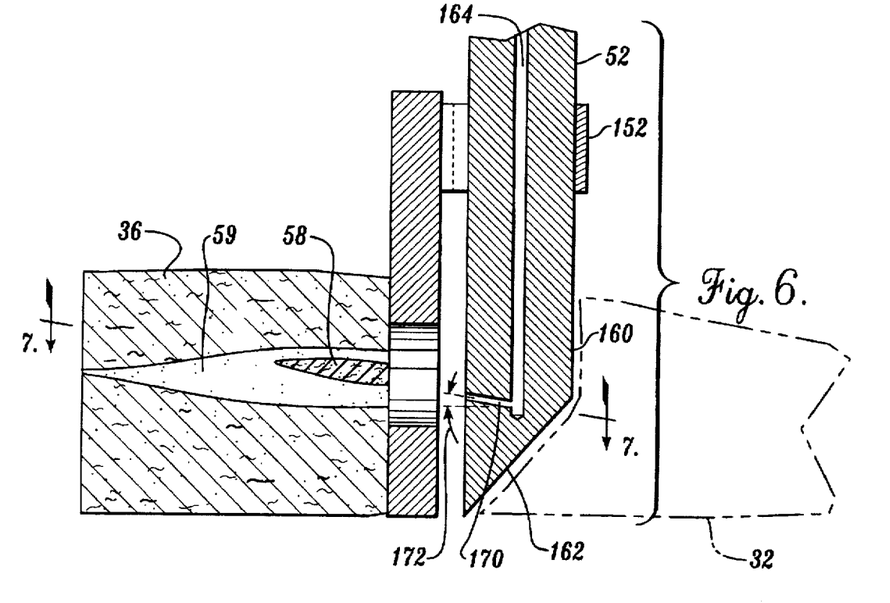
FIG. 6 is a vertical cross-section of the water jet nozzle.
Figure 7:
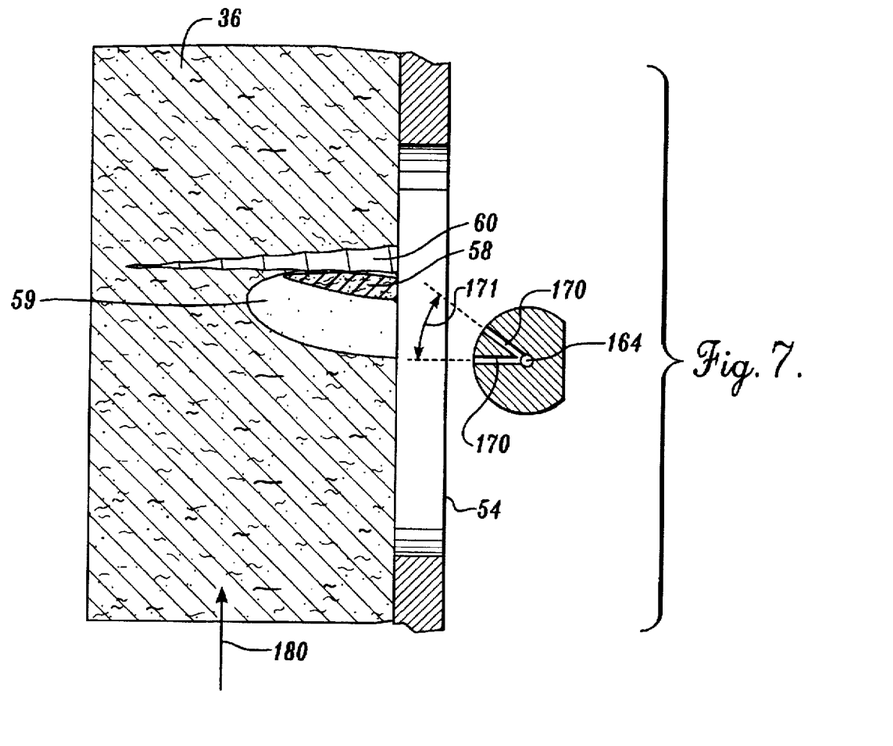
FIG. 7 is a horizontal cross-section of the water jet nozzle.

As described in more detail below, FIGS. 5, 6 and 7 illustrate a cross-section of the water jet nozzle 52 and the center portion 36 of the fish. As illustrated, the blood spot 58 is located in the internal organ cavity 59 directly adjacent the backbone 60 of the fish.

The blades 30 are mounted normal to the upper surface of the conveyor 22 at a height that allows the lower edge of the blades to extend into two slots 110 and 112 (FIG. 3) in the fish holder 20 as described in more detail below. This allows the blades 30 to cut cleanly through the entire thickness of the fish 24 as the conveyor 22 moves the fish past the blades along the processing path. The blades 30 may be any suitable blades sharp enough and durable enough to withstand the harsh and corrosive environment in which they operate.

Located just to the right of the blades 30 are two dividers 38 (FIGS. 1–2 and 4) that extend in line with and parallel to the blades along the portion of the conveyor 22 to the right of the blades. In the preferred embodiment, the dividers 38 are flat plates that extend approximately normal to the conveyor 22 beginning slightly to the fight of the blades and extending to the end of the conveyor where the dividers form the walls of a center chute 40 (FIGS. 1 and 2). The left ends of the dividers 38 begin approximately beneath the center of the blades 30 (FIGS. 2 and 4) and then curve upwardly following the curvature of the blades. The bottom edge of each divider 38 extends into the slots 110 or 112 in the conveyors as described in more detail below. After the fish 24 are cut into a head portion 32, center portion 36, and tail portion 34 (FIG. 4), the conveyor 22 moves the cut-up fish into contact with the dividers 38. The dividers 38 are located in line with the blades 30 so that as the fish is moved to the right of the blades the left end of the dividers 38 slide between the head 12, tail 34 and center portion 36 of the fish, thus separating the head and tail from the center of the fish.

Figure 4:
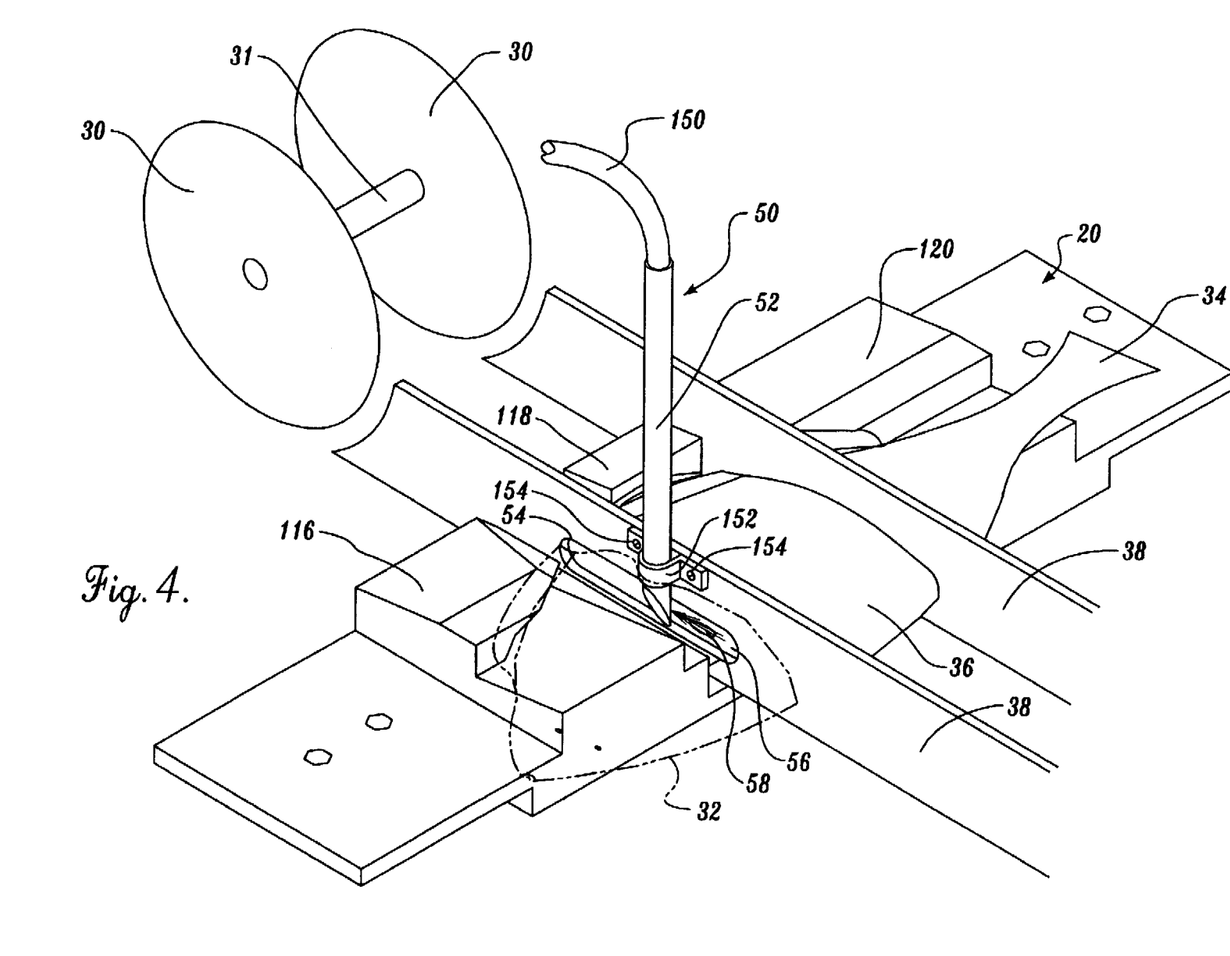
FIG. 4 is a perspective view of the water jet cleaner and head and tail cutters of the fish processor of FIG. 1.

As the conveyor 22 continues to move toward the fight, the center portion 36 moves past a nozzle 52 of a water jet cleaning system 50 (FIG. 4). The water jet cleaning system 50 removes the blood spot 58 and any internal organs remaining within the center portion 36. As described in more detail below, the water jet cleaning system 50 includes the water supply 147, the water valve 146, the water jet nozzle 52, supply tubing 148 and 150, and a control system (not shown) including a proximity sensor 140, a timing motor 142, and an actuation arm 144. The water jet cleaning system 50 produces a high pressure stream of water that flows into the internal organ cavity 59 (FIG. 6) and contacts and removes the blood spot 58 and any remaining internal organs in the center portion 36 as described in detail below.

After the water jet cleaning system 50 removes the blood spot 58 and any remaining internal organs, the conveyor 22 continues to move the fish toward the right, as illustrated in FIG. 1. As the fish continues to move toward the right, the dividers 38 guide the cleaned center portion 36 of the fish into the center chute 40 (FIGS. 1–2) and the head 32 and tail 34 into a waste chute 42. The center chute 40, in turn, guides the center portion of the fish to another conveyor and subsequently to further processing equipment such as packaging and freezing equipment (not shown).

The waste chute 42 guides the head 32 and tail 34 into a waste conveyor which leads to disposal equipment (not shown). The waste chute 42 and center chute 40 are located at the fight end of the conveyor. The center chute 40 is located in the center of the end of the conveyor and its sides are defined by the dividers 38. The center chute extends downward and outward from the end of the conveyor to another conveyor (not shown). The waste chute 42 is located to both the fight and left of the center chute and extends generally downward.

The structure of the fish holders 20 and water jet cleaning system 50 will now be described in more detail. Each fish holder 20 is generally rectangular-shaped and includes an upper surface 91 that is generally flat. The upper surface 91 slopes generally upward from the left edge of the surface to the fight edge of the surface. The fish holder 20 also includes left and fight slots 110 and 112 located near the center of the fish holder and extending perpendicularly across the fish holder normal to its leading and trailing edges. The slots 110 and 112 are parallel and extend downwardly from the upper surface 91 and are sized to allow the blades 30 to pass below the upper surface 91 of the fish holder as each fish holder is moved underneath the blades. The use of slots 110 and 112 ensures that the blades 30 are able to cut cleanly through the entire thickness of a fish 24 placed in the holder.

Two steps 113 and 114 are located to the left and the fight of the left slot 110 and extend across the width of the fish holder parallel to the slot 110. The steps 113 and 114 form a ledge located just below the upper surface 91. The ledge allows a support rail (not shown) which extends along the underside of the conveyor to engage the steps 113 and 114 in order to help support the conveyor and fish holders 20 as they move along the underside of the conveyor.

Figure 3:
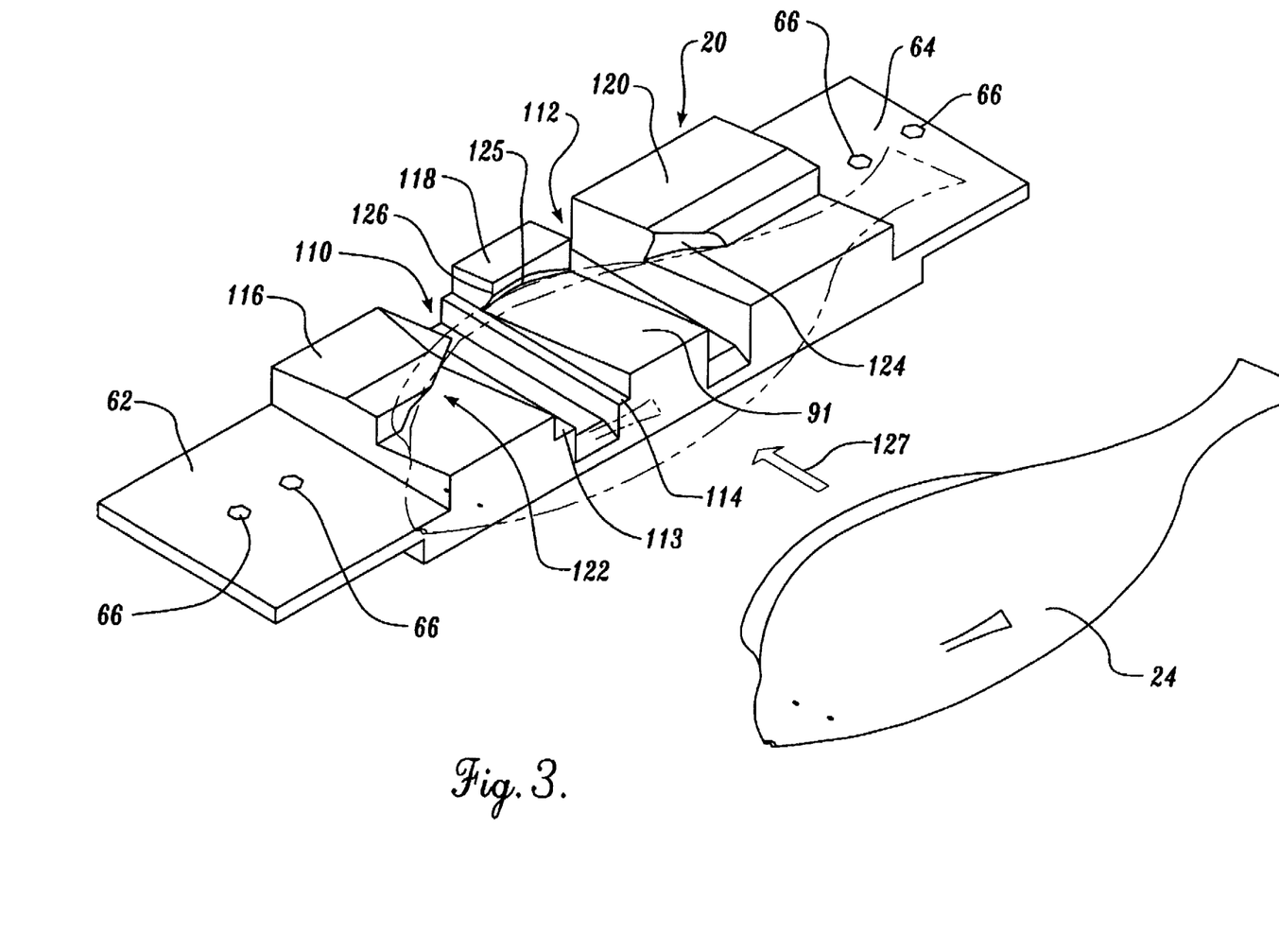
FIG. 3 is a perspective view of an individual fish holder of the fish processor of FIG. 1.

Each fish holder 20 includes left 116, center 118, and fight 120 hold-down brackets (FIG. 3). Each hold down bracket 116, 118, and 120 includes an arm that extends upwardly from the upper surface 91 and forward toward the leading edge of the fish holder. The lower surfaces of the arms on the left and fight brackets 116 and 120 define left and fight recesses 122 and 124 respectively. The rear wall of the recess 122 on the left bracket 116 is curved so as to extend from the forward edge of the left side of the bracket 116 to the fight side of the bracket and at least partially toward the trailing edge of the bracket. Similarly, the recess 124 on the fight bracket 120 curves rearward from the forward edge of the fight side of the bracket 120 to the left side of the bracket and at least partially toward the trailing edge of the bracket. The leading edge of the center bracket 118 also slants downward and rearward to form a recess 125.

As best seen in FIG. 3, a fish 24 is placed within each fish holder 20 by first removing a fish from the hopper 26 (FIG. 1). The fish 24 is then slid underneath the brackets 116, 118 and 120 into the recesses 122, 124 and 125 in the respective brackets as shown in arrow 127. Each of the recesses 122, 124 and 125 are beveled in order to help guide the fins and body of the fish downwardly into the recesses in the brackets. As the fish is slid within the brackets, the curved walls on the recesses of the left and right brackets 116 and 120 help to center the fish within the fish holder. Thus, the hold-down brackets 116, 118 and 120 act as both a centering device and a hold-down device to center and hold the fish 24 within the fish holder 20. Centering the fish with respect to the center of the fish holders helps to ensure that each fish 24 is in proper position to remove both the head 32 and tail 34 while leaving the center 36 of the fish.

Each fish holder 20 is attached to the conveyor 22 through the use of left and right frame extensions 62 and 64 respectively (FIG. 3). Each of the frame extensions 62 and 64 are generally flat rectangular extensions that extend from the left and right ends of the fish holder 20. The left and right extensions 62 and 64 are attached to the conveyor 22 using fasteners (not shown) that extend through holes 66 in the extensions and are received within corresponding receptacles in the conveyor.

As the conveyor moves the fish 24 and fish holders 20 underneath the blades 30, the blades begin cutting off the head 32 and tail 34 of the fish. As a fish holder 20 continues its movement under the blades 30, the blades extend through the slots 110 and 112, thus ensuring that the blades cut completely through the thickness of the fish. After the head 32 and tail 34 of the fish are cut off, the dividers 38 divide the head 32 and tail 34 from the center portion as described above.

In accordance with the present invention, after the head 32 and tail 34 are removed, the blood spot 58 and any internal organs remaining in the center portion 36 are removed by the water jet cleaning system 50. As described briefly above, the water jet cleaning system 50 includes the water supply 145, proximity sensor 140 (FIG. 1), timing motor 142, actuation arm 144, water valve 146, water jet nozzle 52 and supply tubing 148 and 150.

In order to remove the blood spot 58, it is important that the water jet cleaning system 50 be carefully timed with the conveyor to ensure that a high pressure stream of water is released when the blood spot 58 is in the proper location with respect to the water jet nozzle 52. In order to time the water jet cleaning system 50, the proximity sensor 140 (FIG. 1) is mounted underneath the conveyor 22 In the preferred embodiment, a magnetic proximity sensor is used. The proximity sensor is triggered by a bolt or other metal object (not shown) mounted to the bottom surface of each of the fish holders 20.

When an individual fish holder 20 passes a predetermined point on the proximity sensor 140, the proximity sensor is triggered. When triggered, the proximity sensor 140 passes a control signal to a controller (not shown) that controls the timing motor 142. The controller instructs the timing motor 142 to move the actuation arm 144 back and forth across the width of the conveyor 22.

As the actuation arm 144 is moved back and forth, it opens and closes the water valve 146. Opening of the water valve 146 allows water from the water supply 147 to flow through the supply tubing 148 and the water valve 146 and into the supply tubing 150. Similarly, closing the water valve 146 shuts off the flow of water from the water supply 147. The water flowing through the supply tubing 150 in turn flows through the water jet nozzle 52 and thus, into contact with the blood spot 58 and any remaining internal organs as described in more detail below.

In the preferred embodiment, the proximity sensor 140, timing motor 142 and actuation arm 144 are all preexisting components of the Baader 182. The actuation arm 144 is used to center fish when the Baader 182 is used to process pollock. Although the present invention makes use of the Baader 182's preexisting proximity sensor 140, timing motor 142 and actuation arm 144, other apparatus could also be used. For example, the type and location of the proximity sensor could be changed, or the proximity sensor could be electrically connected directly to a controller and an electronically operated water valve, etc.

As best illustrated in FIG. 4, the supply tubing 150 is connected to the upper end of the water jet nozzle 52. The lower end of the water jet nozzle 52 is attached to the exterior surface of the divider 38. The nozzle 52 is attached to the divider 38 using a clamp-type fastening bracket 152 and two fasteners 154. The fasteners 154 extend through opposing sides of the bracket 152 and are received within corresponding receptacles in the divider 38.

As illustrated in FIGS. 5 and 6, the lower end 160 of the nozzle 52 includes an upwardly inclined beveled surface 162. The beveled surface 162 helps the head 32 of the fish to move past the water jet nozzle 52 without becoming caught up on the nozzle. The nozzle 52 also includes a centrally-located water passage 164 (FIG. 5) that extends from the top of the nozzle the majority of the way to the bottom of the nozzle. One or more water passages 170 extend radially outward from the lower end of the passage 164 to the exterior surface of the nozzle. As illustrated in FIG. 6, the passages 170 are oriented so that a stream of water flowing through the passages 170 flows out of the nozzle 52, through a slot 54 in the divider 38 and into the interior cavity 59 of the center portion 36 of the flat fish.

In the preferred embodiment, the water jet nozzle 52 includes two passages 170. The first passage 170 extends radially outward approximately perpendicular to the dividers 38 and thus the processing path of the flat fish. The second nozzle 170 extends radially outward and forward at an angle 171 of approximately 25°, to direct a stream of water forward into contact with the blood spot 58 of the fish. As shown in FIG. 5, both of the passages 170 extend at a slightly upward directed angle 172 of approximately 5° as illustrated in FIG. 5.

In the preferred embodiment, it was found most advantageous to slope the passages 170 slightly upward as illustrated in FIG. 5. Slightly upward angle 171 up the passages 170 helps to produce a high pressure stream of water that flows directly into the cavity 159. However, in alternate embodiments in the invention, the passages 170 could extend parallel to the surface of the conveyor or at different angles to the surface of the conveyor than shown in the preferred embodiment. It is believed that the most advantageous magnitude of the angle 172 is between 2 and 10 degrees.

Similarly, in alternate embodiments of the invention, the second passages 170 could extend forward at an angle 171 that differs from the preferred embodiment. However, it is believed that the most advantageous magnitude of the angle 171 ranges from 10° to 40°.

In the preferred embodiment, it was found most advantageous to use both a perpendicular passage 170 and a forward directed passage 170 to provide the best cleaning action. However, in other applications, depending upon the speed of the conveyor 22, the types of fish being processed, the water pressure used, the diameter of the passages 170, etc., it may be advantageous to use one passage or three or more passages 170.

In the preferred embodiment, the passages 170 have a circular cross section and a diameter of approximately 1–2 millimeters. The most advantageous results were achieved in the preferred embodiment when water is injected through the passages 170 at approximately 1000–2000 psi. It was also found most advantageous to inject water through the passages 170 for approximately 1/10th of a second for each fish being processed.

In alternate embodiments of the invention passages 170, different cross-sectional shapes in diameters could be used. Similarly, in other applications, it may be advantageous to inject water through the passages for a different amount of time or at different pressures than used in the preferred embodiment.

In the preferred embodiment, flat fish are processed at a rate of approximately 120–150 fish a minute. Therefore, it is important that the water jet cleaning system 50 be carefully timed to remove the blood spot 172 and any organs remaining in the interior of the cavity within the time frame allotted. In the preferred embodiment, the water jet cleaning system 50 is timed so that as a fish 24 is moved from left to right along the processing path as illustrated by arrow 180 in FIG. 7, water flows through the passages 170 as the blood spot 58 moves approximately in line with the passages 170. Water is then injected into the cavity 59 for approximately 1/10th of a second at which point the blood spot of the fish has moved past the nozzle 52.

As can be seen from the above discussion, fish are processed at extremely high rates through the apparatus 50. One way to maximize efficiency of the water jet cleaning system is to maximize the amount of time that the blood spot 58 remains in front of the water passages 170. This in turn maximizes the amount of time that the water jet cleaning system 50 has to remove the blood spot 58 and any remaining internal organs.

Figure 8:
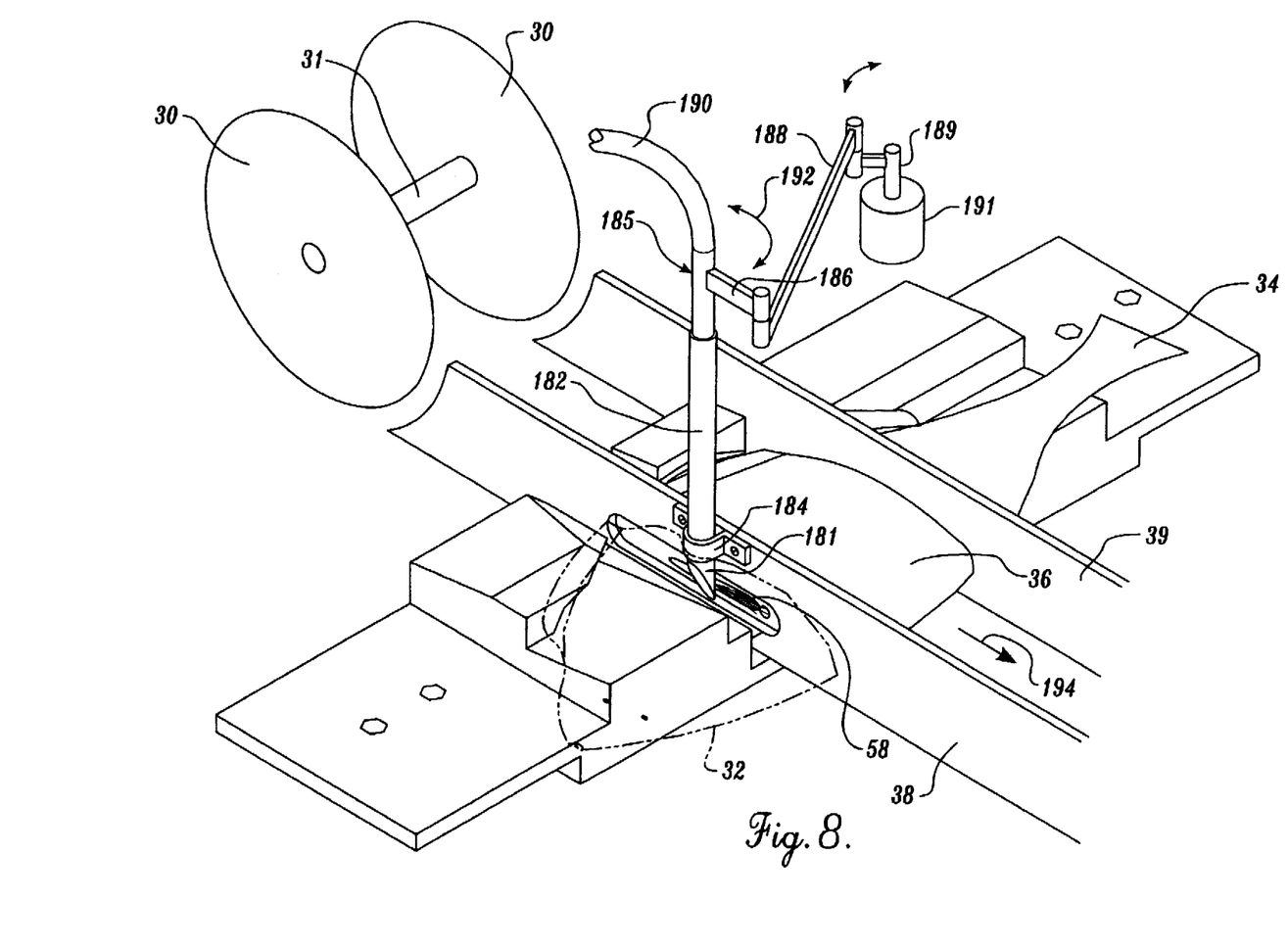
FIG. 8 is a perspective view of an alternate embodiment of a water jet cleaner according to the present invention.

In order to maximize the amount of time that the blood spot 58 is in front of the stream of water produced by the water jet cleaning system 50, an alternate embodiment of the invention is illustrated in FIG. 8. Except as described below, the alternate embodiment of the invention functions in a manner similar to that described above with respect to the preferred embodiment of the invention. Any features of the alternate embodiment of the invention not discussed below may be understood by reference to the above discussion of the preferred embodiment of the invention.

In the alternate embodiment, the water jet nozzle 181 is pivotally mounted within a support tube 182. The support tube 182 is in turn mounted to the divider 38 by support bracket 184. The support bracket 184 is fastened to the divider 38 using fasteners in a manner similar to that described above with respect to the preferred embodiment. The upper end 185 of the water jet nozzle 181 extends above the top of the support tube 182 and is connected to the water valve by supply tubing 190. An arm 186 extends radially outward from the upper end 185 of the water jet nozzle. The outermost end of the arm 186 is pivotally attached to a drive arm 188. The drive arm 188 is in turn attached to an eccentric cam 189 on a timing motor 191.

The timing motor 191 is connected to the control system (not shown) that is in turn connected to the proximity sensor 140 (FIG. 1) that operates the timing motor 142 and water valve 146. The control system causes the timing motor 191 to rotate a predetermined amount when the center portion 36 of a fish passes in front of the water jet nozzle 181. The movement of the timing motor 191 in turn moves the drive arm 188 back and forth thus causing the water jet nozzle 181 to rotate clockwise and then counter clockwise as illustrated by arrow 192.

As the center portion 36 of the fish moves in line with the passages in the water jet 181, a high pressure water stream is produced. The passages in the water jet nozzle 181 direct the high pressure water stream into the internal cavity of the flat fish to remove the blood spot 58 in a manner similar to that described with respect to the preferred embodiment. As the center portion 36 of the fish continues to move along the processing path as illustrated by arrow 194, the timing motor 191 rotates the water jet nozzle 181 clockwise. The clockwise rotation of the water jet nozzle rotates the passages in the water jet nozzle forward. This rotation allows the stream of water from the water jet nozzle 181 to follow the movement of the blood spot and internal cavity. Thus, the rotation of the water jet nozzle 181 increases the amount of time that a stream of water from the water jet cleaning system sprays into and contacts the blood spot 58 and internal cavity of the flat fish. Thus, the rotation of the water jet nozzle 181 increases the efficiency of the water jet cleaning system. Once the center portion 36 of one flat fish passes through the water jet cleaning system, the water jet nozzle 181 is rotated counterclockwise back to its original position so that it is in the proper position for the next flat fish.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for processing flat fish into kirimi, the apparatus comprising:
   (a) a tray for holding and locating the flat fish on a processing conveyor;
   (b) at least one head and tail cutter for removing the head and tail of the flat fish to form a center portion of kirimi as the flat fish is moved along a processing path; and
   (c) a water jet cleaning system for removing a blood spot and remaining internal organs in the center portion, the water jet cleaning system including a water jet nozzle located downstream from the head and tail cutters along the processing path, the water jet nozzle having an outlet water passage directed into a cavity in the center portion of the flat fish, the water jet cleaning system producing a high pressure stream of water that flows through the outlet passage into the cavity to remove the blood spot of the flat fish.

2. The apparatus of claim 1, wherein the water jet nozzle includes at least two outlet passages, one of said outlet passages directed to produce a stream of water flowing approximately normal to the processing path and one of said outlet passages directed to produce a stream of water flowing at an angle forward along the processing path.

3. The apparatus of claim 1, wherein the water jet cleaning system includes means for rotating the water jet nozzle as the center portion of the flat fish is moved along the processing path so that said stream of water follows the center portion as it moves along the processing path.

4. An apparatus for removing a blood spot from kirimi, the apparatus comprising:
   (a) means for determining the location of the kirimi along the processing path and for providing an indication of the location of the kirimi;
   (b) a water jet cleaning system for removing the blood spot, the water jet cleaning system including a water supply, a water jet nozzle, and a water valve to control the supply of water from the water supply to the water jet nozzle in response to the indication of the location of the kirimi, the water jet nozzle having an outlet passage positioned to direct a high pressure stream of water into an internal cavity of the kirimi to contact and remove the blood spot.

5. The apparatus of claim 4, wherein the water jet nozzle includes at least two outlet passages, one of said outlet passages directed to produce a stream of water flowing approximately normal to the processing path and another of said outlet passages directed to produce a stream of water flowing at an angle forward along the processing path.

6. The apparatus of claim 1, wherein the water jet nozzle is rotatably coupled to the water jet cleaning system to allow the water jet nozzle to rotate as the kirimi moves along the processing path to rotate the outlet passage so that the stream of water produced by the water jet cleaning system follows the movement of the kirimi along the processing path.

7. A method of producing kirimi, the method comprising:
 (a) passing a flat fish through one or more cutters to remove the head and tail of the flat fish to leave a center portion of the flat fish as the flat fish is moved along the processing path;
 (b) moving the center portion in front of a water nozzle so that an internal cavity in the center portion is in line with one or more water passages in the water jet nozzle;
 (c) passing a high pressure stream of water through the water jet nozzle so that the passages in the water jet nozzle direct the high pressure stream of water into the internal cavity and into contact with a blood spot in the internal cavity to remove the blood spot from the internal cavity.

8. The method of claim 7, wherein the water jet nozzle includes two or more passages and wherein the method further comprising producing a high pressure stream of water through a first passage so that the stream of water flows into the internal cavity approximately perpendicular to the processing path and producing a second stream of water flowing through a second passage so that the second stream of water flows at an angle forward along the processing path and into the internal cavity.

9. The apparatus of claim 1 further comprising rotating the water jet nozzle as the center portion is moved along the processing path so that the stream of water produced from the water jet nozzle follows the movement of the center portion along the processing path.

10. An apparatus for processing fish into kirimi, the apparatus comprising:
 (a) a tray for holding and locating the flat fish on a processing conveyor;
 (b) at least one head and tail cutter for removing the head and tail of the flat fish to form a center portion as the flat fish is moved along a processing path;
 (c) a proximity sensor to determine the location of the flat fish along the processing path and to produce a signal indicative of the location of the flat fish along the processing path;
 (d) a water jet cleaning system for removing a blood spot and remaining internal organs in the center section, the water jet cleaning system including a water supply, a water valve and a water jet nozzle, the water jet nozzle being positioned downstream from the head and tail cutter along the processing path and including one or more water passages directed to produce a stream of water that flows into a cavity in the center portion of the flat fish, the water valve opening in response to the indication of the location of the flat fish to allow water to flow from the water supply through the water jet nozzle and into the cavity in the center portion of the flat fish.

11. The apparatus of claim 10, wherein the water jet nozzle includes two outlet passages, one of said outlet passages directed to produce a stream of water flowing approximately normal to the processing path and one of said outlet passages directed to produce a stream of water flowing at an angle forward along the processing path.

12. The apparatus of claim 10, wherein the water jet cleaning system includes means for rotating the water jet nozzle as the center portion of the flat fish is moved along the processing path so that the stream of water follows the center portion as it moves along the processing path.

* * * * *

UNITED STATES PATENT AND TRADEMARK OFFICE
CERTIFICATE OF CORRECTION

PATENT NO. : 5,628,680  
DATED : May 13, 1997  
INVENTOR(S) : J. Hjorth

It is certified that error appears in the above-indentified patent and that said Letters Patent is hereby corrected as shown below:

| COLUMN | LINE | |
|---|---|---|
| 10 (Claim 1, | 32 line 5) | After "cutter for" insert --cutting through the flat fish along a head cut and a tail cut extending transverse to a lengthwise axis of the flat fish-- |
| 10 (Claim 1, | 36 line 9) | After "organs in" insert --a cavity extending lengthwise along-- |
| 10 (Claim 1, | 40 line 13) | After "directed" insert --through at least one of the head cut and tail cut-- |
| 10 (Claim 1, | 40 line 13) | "a cavity" should read --the cavity-- |
| 10 (Claim 4, | 57 line 1) | After "kirimi" insert --formed by cutting the head and tail of a flat fish off along a head cut and a tail cut transverse to a lengthwise axis of the flat fish-- |
| 10 (Claim 4, | 60 line 4) | "the processing" should read --a processing-- |
| 11 (Claim 4, | 2 line 13) | After "water" insert --through at least one of the head cut and tail cut and-- |
| 11 (Claim 7, | 18 line 3) | After "the flat fish" insert --by forming a head cut and a tail cut transverse to a lengthwise axis of the flat fish-- |

UNITED STATES PATENT AND TRADEMARK OFFICE
CERTIFICATE OF CORRECTION

PATENT NO. : 5,628,680
DATED : May 13, 1997
INVENTOR(S) : J. Hjorth

It is certified that error appears in the above-indentified patent and that said Letters Patent is hereby corrected as shown below:

| COLUMN | LINE | | |
|---|---|---|---|
| 11 (Claim 7, | 23 line 8) | After "nozzle;" insert --and-- | |
| 11 (Claim 7, | 26 line 11) | After "stream of water" insert --through at least one of the head cut and the tail cut-- | |
| 12 (Claim 10, | 9 line 6) | After "fish" insert --along a head cut and a tail cut transverse to a lengthwise axis of the flat fish-- | |
| 12 (Claim 10, | 14 line 11) | After "path;" insert --and-- | |
| 12 (Claim 10, | 22 line 19) | After "flows" insert --through at least one of the head cut and the tail cut-- | |

Signed and Sealed this

Sixteenth Day of September, 1997

Attest:

BRUCE LEHMAN

Attesting Officer     Commissioner of Patents and Trademarks